March 23, 1926.
G. J. GAHRING
CURTAIN STRETCHER
Filed July 17, 1925
1,578,117
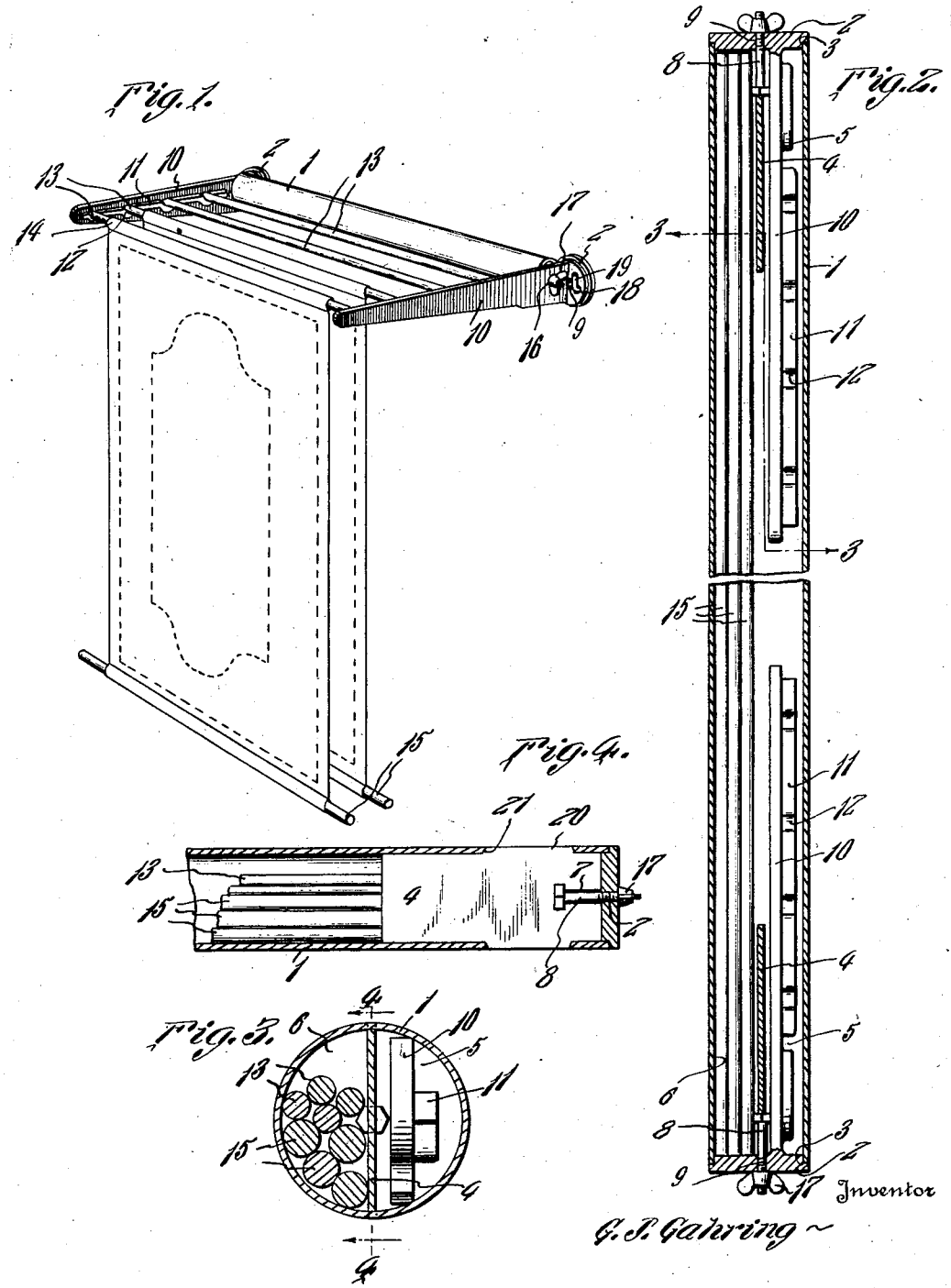

Patented Mar. 23, 1926.

1,578,117

UNITED STATES PATENT OFFICE.

GEORGE J. GAHRING, OF SAN ANTONIO, TEXAS.

CURTAIN STRETCHER.

Application filed July 17, 1925. Serial No. 44,205.

*To all whom it may concern:*

Be it known that GEORGE J. GAHRING, a citizen of the United States of America, residing at San Antonio, in the county of Bexar and State of Texas, has invented new and useful Improvements in Curtain Stretchers, of which the following is a specification.

It is a purpose of the present invention to provide, in a curtain stretcher, a structure consisting of very few parts including a tubular casing (which acts as a member of a support when the stretcher is in use) which is adapted to receive the parts of the stretcher when not in use, the whole being in small compass, easily capable of storage or transportation from one place to another.

Another purpose is to provide, in a curtain stretcher, a container or casing with closures at its opposite ends to prevent displacement of parts of the stretcher when contained therein and to constitute hangers for the casing when the stretcher is in use, the container or casing adapted to receive a plurality of supporting and stretcher rods to insure proper stretching of the curtains.

Still another purpose is the provision of supporting arms on the closures for the reception and the support of certain of the rods from which the curtains are suspended when the other rods act as weights at the lower ends of the curtains to insure their stretching.

It is to be understood that the particulars herein given are in no way limitative and that, while still keeping within the scope of the invention, any desired modifications of detail and desired proportions may be made in the apparatus according to the circumstances.

The invention comprises further features and combinations of parts to be hereinafter set forth, shown in the drawings and claimed.

In the drawings:

Figure 1 is a view in perspective showing the improved curtain stretcher in use.

Figure 2 is a sectional view through the casing or container, showing the parts of the stretcher disassembled and arranged within the casing which constitutes a storage container.

Figure 3 is a cross sectional view on line 3—3 of Figure 2, showing how the casing is at each end divided into two compartments.

Figure 4 is a sectional view on line 4—4 of Figure 3.

Referring to the drawings, 1 designates a casing which also constitutes a container for the several parts of the curtain stretcher, and 2 denotes the closures or casing heads which are annularly recessed at 3, that is, exteriorly on their margins, to provide for entering the ends of the casing as in Figure 2. The opposite ends of the casing or container are divided by partitions 4, dividing the casing or container in two compartments 5 and 6, that is, at the ends of the casing. The central portion of the casing only has the one compartment into which the end compartments merge.

The partitions adjacent the ends of the casing or container are longitudinally slotted, as at 7, for the purpose of receiving the bolts or screws 8. In fact, the heads of the bolts or screws are seated and welded or otherwise secured in the crotches of the slots 7 so as to hold them secure and rigid. The casing heads or closures 2 have central openings 9 for the reception of the shanks of the bolts or screws when the heads or closures are engaged with the ends of the casing or container. Supporting arms 10 are constructed integrally with the closures or casing heads and when the casing heads or closures are connected to the ends of the casing or container, the supporting arms 10 pass through and are located in the compartments 5.

Certain faces of the supporting arms, particularly their faces which are adjacent when the arms are arranged as in Figure 1, have cleats 11, the upper edges of which are recessed or socketed, as at 12, for the reception of the ends of curtain supporting rods 13. The rods 13 pass through the hems 14 at the tops of the curtains while weighted rods 15 pass through the hems at the lower ends of the curtains. These rods 13 and 15, when not in use and the curtain supporting arms 10 arranged in the storage container or casing 1, are received in the compartments 6, as shown clearly in Figures 2 and 3.

The supporting arms 10 at points where they are made integral with the casing heads or closures 2 have openings 16 for the reception of the bolts or screws 8 when the supporting arms are disposed as in Figure 1, suitable wing nuts 17 being engaged with the bolts or screws 8 to hold the arms against the opposite ends of the casing or container.

The casing heads or closures 2 have, in addition to their central openings 9, openings 18 which receive suitable nails or similar supports 19 when the casing heads are removed from the ends of the cylinder and disposed as in Figure 1. In other words, the nails or supports 19 are driven into a suitable stationary support and then passed through the openings 18 and their extremities bent to preclude displacement of the casing heads or closures.

The partitions 4 are secured in place by means of tongues 20 formed integrally on the opposite longitudinal edges and which are engaged and welded or otherwise secured in longitudinal slots 21 formed in the casing or container adjacent its opposite ends, that is, at diametrically opposite points. The slots 21 extend longitudinally and in order to arrange the partitions 4 in position, they are bowed sufficiently to force them in the ends of the casing or container, and when the tongues 20 are opposite the slots, the partitions are allowed to straighten out, allowing the tongues to spring into the slots. In this way, the tongues may be held in the slots frictionally or due to the springing out of the partitions, or they may be welded or otherwise permanently fastened in place.

In the operation, the wing nuts are first removed from the ends of the casing or container. The casing heads or closures are detached, their arms 10 withdrawn from the casing allowing the arms to be placed as in Figure 1 so that the screws or bolts may pass through the openings 16 in the arms and then the wing nuts are again threaded to the bolts. The arms 10 are in parallelism, as in Figure 1, projecting outwardly and due to the smaller supporting rods 13 engaging the sockets or recesses 12 and passing through the upper hems of the curtains, the curtains are suspended, the weighted rods 15 engaging the hems at the lower ends of the curtains. However, prior to arranging the rods 13 in the positions shown in Figure 1, suitable nails or other supports are driven approximately seven feet from the ground into the side of the garage or house and then their exposed portions are passed through the openings 18 of the casing heads or closures, as in Figure 1.

After washing the curtains and they are ready to be stretched and dried, they are arranged as shown in Figure 1, as previously stated, and then it is essential to use both hands for pulling the curtains sidewise and pulling out the mesh and downwardly, and the more the curtains are pulled without tearing, the better they are stretched and the more even they will hang when applied to windows. The heavy rods at the bottom hems of the curtains will maintain the curtains substantially stretched. It is essential to mount the stretcher on the side of the garage or house or other place of support where the curtains will have the sun practically the entire time they are being stretched and dried. The curtains will dry straight, so that when they are hung at windows, they will hang straight. Should the curtains be scalloped at their lower ends instead of hemmed, temporary hems may be made in the curtains to receive the weighted rods 15. Upon an inspection of the drawing, in connection with the above description, it is obvious how the curtain stretcher may be taken down and its parts arranged in the casing or container for storage, the casing being small enough to hold the parts in a small compass.

The invention having been set forth, what is claimed is:

1. A curtain stretcher comprising a container having removable container heads and curtain supporting arms carried by the heads, and disposable laterally of the container in parallelism, and means at the ends of the container for passing through the arms when removed from the container and disposed laterally of the ends of the container or through the heads when the arms are arranged within the container.

2. The combination with the structure embodied in claim 1, of suspension rods for operative mounting on the arms when in parallelism for the suspension of curtains.

3. In a curtain stretcher, the combination with a container having partitions at its opposite ends dividing the container into longitudinal compartments, container heads fitting within the opposite ends of the container and having arms carried in certain of said compartments, said container heads and arms being removable to dispose them laterally of the container and in parallelism, means carried by the partitions and passing through the heads for connecting the latter to the ends of the container, suspension rods adapted to be stored in the other compartments, the rods to operatively engage with said arms when the heads and the arms are disposed parallel, the head securing means passing through the arms when the latter are removed and disposed parallel, and means for supporting the heads upon a stationary support.

4. A curtain stretcher comprising a hollow casing, arms mounted in parallelism on the ends of said casing, and rods mounted across said arms, the said rods and arms being detachably connected, whereby the latter may be stored in said casing.

In testimony whereof he affixes his signature.

GEORGE J. GAHRING.